United States Patent [19]
DiBartolomeo

[11] Patent Number: 6,149,370
[45] Date of Patent: Nov. 21, 2000

[54] MATERIALS HANDLING CARTS WITH REMOTELY CONTROLLED DECOUPLING

[76] Inventor: Renato DiBartolomeo, 4349 Bender, Troy, Mich. 48098

[21] Appl. No.: 09/252,261

[22] Filed: Feb. 18, 1999

Related U.S. Application Data

[63] Continuation-in-part of application No. 09/178,972, Oct. 26, 1998.

[51] Int. Cl.$^7$ ...................................................... B60P 7/00
[52] U.S. Cl. .............................. 414/498; 410/69; 296/3; 414/401; 414/396
[58] Field of Search .................................... 414/396, 401, 414/584, 467, 498, 500, 501; 410/3, 4, 7, 18, 66, 67, 69, 77; 269/50, 56; 188/32

[56] References Cited

U.S. PATENT DOCUMENTS

| | | |
|---|---|---|
| 2,541,288 | 2/1951 | Rice . |
| 3,043,454 | 7/1962 | Butler et al. . |
| 3,611,949 | 10/1971 | Peisner . |
| 3,618,796 | 11/1971 | Peisner . |
| 3,667,635 | 6/1972 | Hackney .................................. 414/498 |
| 3,817,413 | 6/1974 | Hahn ....................................... 414/498 |
| 3,857,504 | 12/1974 | Bausenbach et al. ................... 414/500 |
| 4,207,019 | 6/1980 | Cone ....................................... 414/373 |
| 4,231,695 | 11/1980 | Weston, Sr. ......................... 414/498 X |
| 4,282,621 | 8/1981 | Anthony et al. .................... 414/401 X |
| 4,307,683 | 12/1981 | Parker, Jr. . |
| 4,966,510 | 10/1990 | Johnson, Jr. . |
| 5,105,951 | 4/1992 | Gearin et al. . |
| 5,106,246 | 4/1992 | Chance . |
| 5,360,307 | 11/1994 | Schemm et al. .................... 414/401 X |
| 5,453,735 | 9/1995 | Hahn ................................... 414/401 X |

FOREIGN PATENT DOCUMENTS

| | | | |
|---|---|---|---|
| 92/06244 | 4/1992 | WIPO .................................... 414/401 |

Primary Examiner—Frank E. Werner
Attorney, Agent, or Firm—Gifford, Krass, Groh, Sprinkle, Anderson & Citkowski, P.C.

[57] ABSTRACT

An automated latching and release system is adapted for use with carts of the type configured for materials handling and a vehicle such as a semi-truck trailer used to transport such carts. A latching mechanism includes a latch member which physically engages with a cart so as to retain the cart in a transport position, and one or more switches physically remote from the latching mechanism, enabling an operator to release a cart without having to manipulate the latch member directly. The latching mechanism is preferably located within the forward section of the transport vehicle to make a coupling engagement with the forwardmost cart of a joined train of carts. With at least one of the switches positioned proximate to the rearward section of the transport vehicle, a user may disengage the set of carts from the latching mechanism and remove the set of carts through the rearward section of the vehicle without having to visit the forward section of the transport vehicle. In alternative embodiments, the latching mechanism may be electrically, hydraulically, or pneumatically controlled by the switch.

26 Claims, 6 Drawing Sheets

MATERIALS HANDLING CARTS WITH REMOTELY CONTROLLED DECOUPLING

CROSS REFERENCE TO RELATED APPLICATION

This application is a continuation-in-part of U.S. patent application Ser. No. 09/178,972 filed Oct. 26, 1998 entitled MATERIALS HANDLING CARTS WITH REMOTELY CONTROLLED DECOUPLING.

FIELD OF THE INVENTION

This invention relates generally to materials handling and, in particular, to latchable carts that may be decoupled from within a larger transport carrier through a remotely activated latch mechanism.

BACKGROUND OF THE INVENTION

In the manufacturing of products through the assembly of component parts, it is often the case that such parts or subassemblies are at least temporarily retained in storage positions or in inventory awaiting use. This is often the circumstance in both light manufacturing and heavy industry, including the production of automobiles and other vehicles.

Depending upon the progress of the assembly process, it may be advantageous to utilize remote locations for component part staging, in which case the parts need to be transported to the manufacturing area on a demand basis. For example, it is common to load carts with parts or subassemblies and deliver these carts to the point of assembly, as required. Although such carts are stored at a distance from the actual manufacturing operation, they may be latched together in train-like fashion and pulled along with some form of operator-controlled vehicle.

In some cases, parts carts of this kind are loaded onto larger transport carriers, such as semi-trailers, and problems often arise both in terms of cart transport and removal from the trailer. As for transport, unless the carts are somehow physically secured to one another and/or to the trailer, the carts may become unacceptably unstable, particularly during a rough ride. However, tethering the carts to each other and/or to the trailer tends to create consequential problems during cart removal. The operator of the vehicle or other device used to pull the carts out of the trailer must somehow unlatch them, which might require that the operator "crawl over" the carts in the trailer and unfasten chains or pin-secured bars.

Undoubtedly, any arrangement capable of simplifying or automating the process of loading and de-coupling carts of this kind from a larger carrier or vehicle would be appreciated by those engaged in such activities.

SUMMARY OF THE INVENTION

The present invention resides in an automated latching and release system adapted for use with carts of the type configured for materials handling and a vehicle such as a semi-truck trailer of the type used to transport carts of this kind. Broadly, the invention provides a latching mechanism including a latch member which physically engages with a cart so as to retain the cart in a transport position, and one or more switches physically remote from the latching mechanism, enabling an operator to release a cart without having to manipulate the latch member directly.

In a typical embodiment, the transport vehicle is adapted to receive a set of carts joined to one another in train-like fashion, with the latching mechanism being preferably located within the forward section of the transport vehicle to make a coupling engagement with the forwardmost cart. With at least one of the switches positioned proximate to the rearward section of the transport vehicle, a user may disengage the set of carts from the latching mechanism and remove the set of carts through the rearward section of the vehicle without having to visit the forward section of the transport vehicle, as is now typically the case.

In alternative embodiments, the latching mechanism may be electrically, hydraulically, or pneumatically controlled by the switch. Preferably, a plurality of conveniently accessible switches are provided on one or more upstanding walls associated with the transport vehicle. Although the same mechanism used to join the carts to one another may be used to engage with the latching mechanism, each cart preferably includes a feature dedicated to physically interact with the latch mechanism such as latch bar. The platform of the transport vehicle may also further include one or more rails for engaging with the wheels of a cart to better stabilize each cart while it is retained in the transport position.

DETAILED DESCRIPTION OF THE INVENTION

Figure 1:
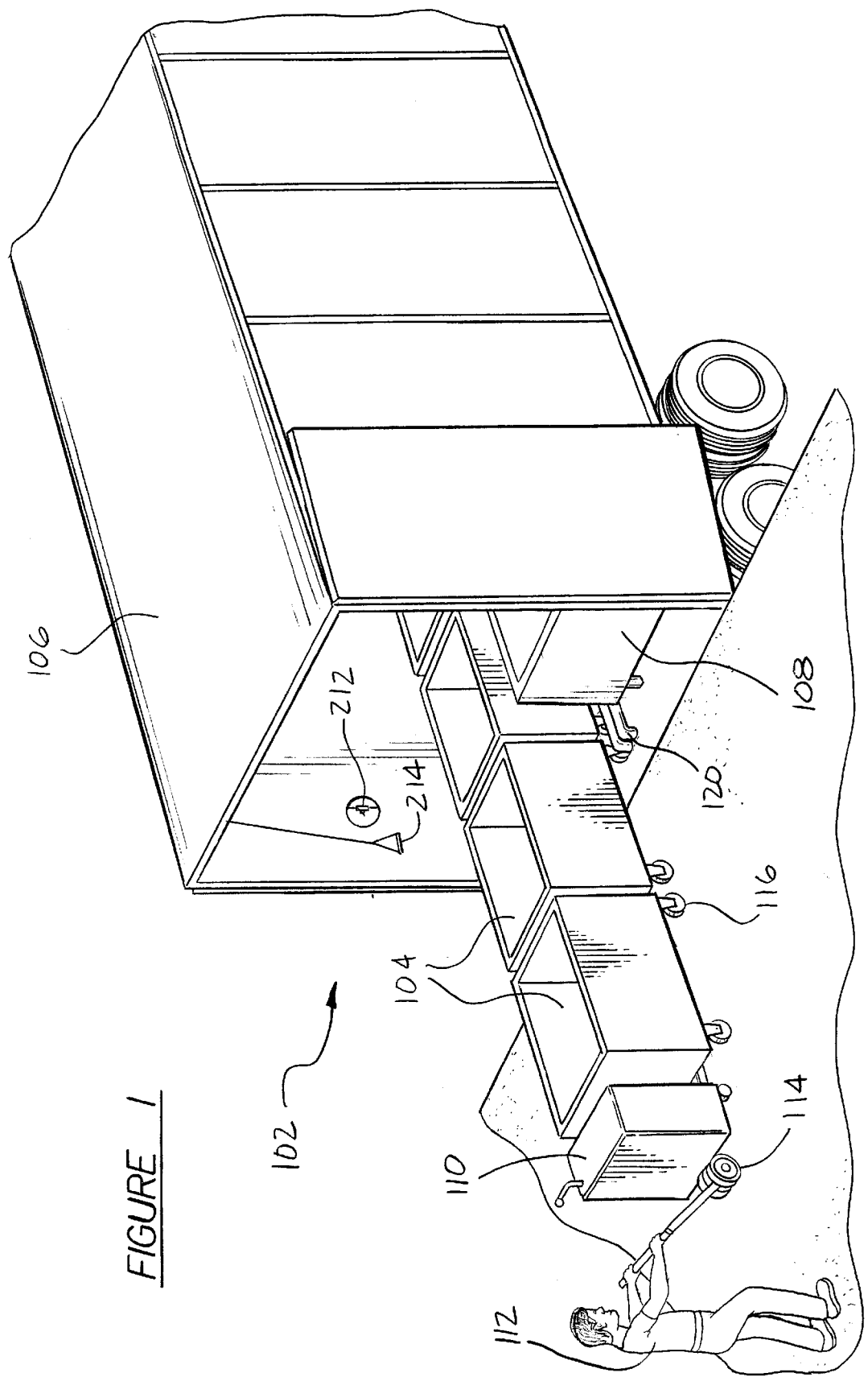
FIG. 1 is a drawing of an operator moving a set of materials handling carts relative to the trailer of a semi-truck.

Turning now to the illustrations, and making reference to FIG. 1 in particular, there is shown generally at 102 an arrangement which takes advantage of the inventive concepts disclosed herein. Broadly, as seen in this figure, one or more carts 104 having wheels 116 are being moved with respect to the opening of a semi-trailer 106 through the rearward end thereof. In this case, the dimensions of the carts 104 and trailer 106 are such that two sets of carts may be accommodated by the trailer bed, and a second set of carts 108 is shown installed entirely within the truck trailer 106.

An operator 112 is using a forklift-type powered unit 110 having wheels 114 to manipulate the carts 104 with respect to the truck on a loading-dock. The inside of the truck has a plurality of side walls upon which there is supported one or more automated switches such as 212 and/or manually operable switches 214, which may be better understood in relation to subsequent figures.

Although the embodiment described in detail herein utilizes material-handling carts adapted for loading onto a conventional semi-trailer truck, including additions or modifications according to the invention, it should be understood that the inventive principals are applicable to a wide range of applications apart from those depicted and described herein with specificity. Indeed, as will become evident through the descriptions below, one of skill in the art of materials transport will appreciate that the invention is equally applicable to any cargo-movement situation wherein, in particular, the need exists for a controllable latching mechanism and one or more switches disposed remotely from the latching mechanism to enable an operator associated with loading or unloading to at least unlatch the carts without actually having to physically interact with the latching mechanism proper. Accordingly, the invention is not limited to semi-trailer use, but is also applicable to other types of trucks and materials transport vehicles, shipping, and even water-going vessels, should these alternative operational environments utilize a latching mechanism which is difficult or impossible to access, and therefore in need of a remotely disposed control.

Figure 2:
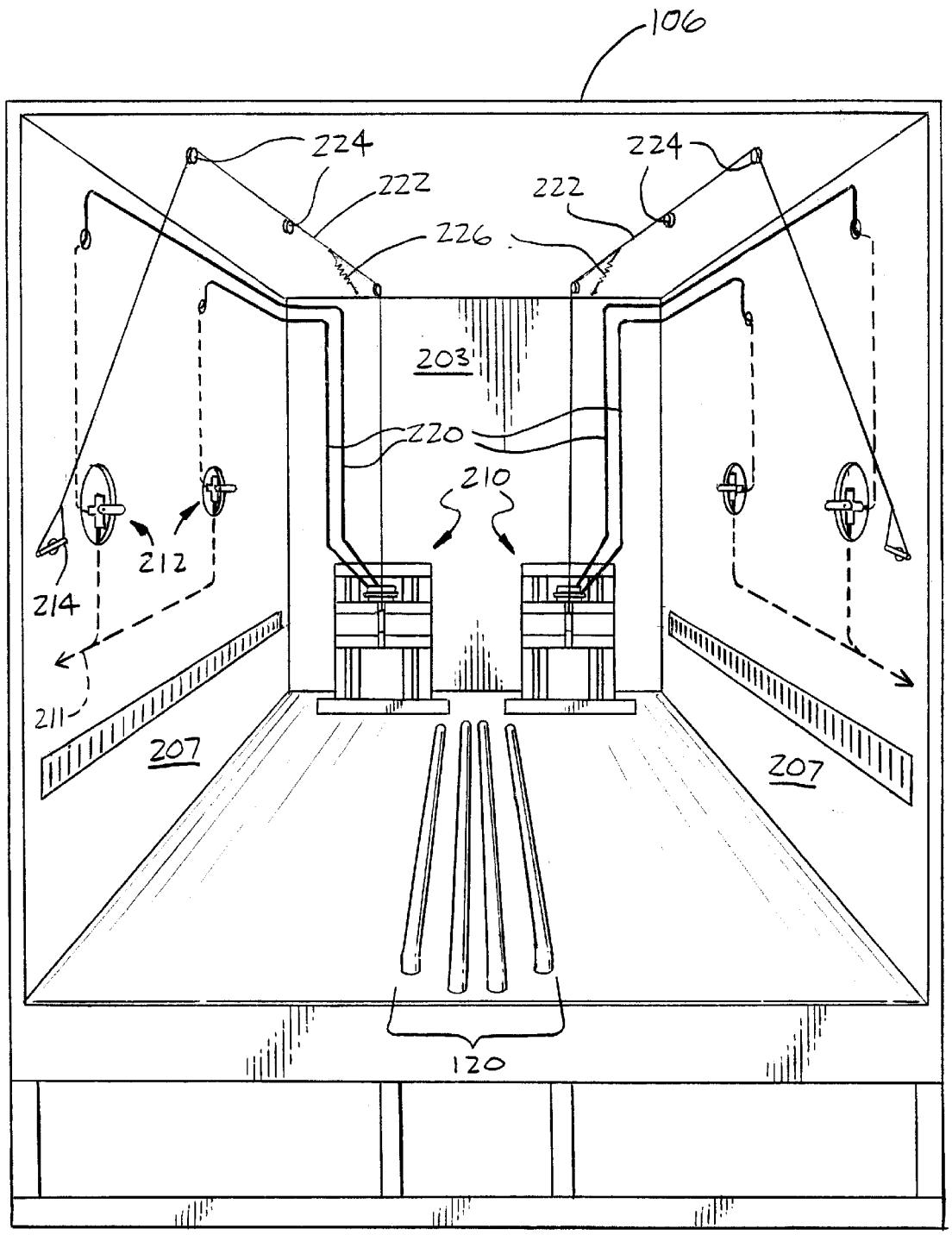
FIG. 2 is a drawing looking into the rear-loading end of a semi-truck, illustrating major features according to a preferred embodiment of the invention.

FIG. 2 is a view into the back or loading end of a semi-trailer, as might be seen from a loading dock, with the carts of FIG. 1 having been removed to better reveal important aspects of the instant invention. The inside of the trailer includes a forward wall 203 adjacent to which there is situated one or more latch mechanisms 210 which will be described in greater detail with respect to subsequent figures. The interior also includes two sides walls 207 which are preferably used to support one or more automatic and/or manual controls to which the latch mechanisms 210 are responsive.

In the embodiment now being described, where two sets of carts are loaded and unloaded side-by-side, an identical set of controls is preferably provided on opposing side walls 207 as shown, one set of controls each for an attendant latching mechanism. Given this arrangement, only the features of the latching mechanism and controls on the lefthand side of FIG. 2 will be described, with the understanding that the controls for the other latching mechanism are similar, if not identical, at least in terms of functionality.

In a preferred embodiment, both automatic switches 212 and a manual device 214 are provided to unlatch and release carts retained within the cart-hauling vehicle, as will be better understood in conjunction with the description of subsequent figures. In the embodiment depicted in FIG. 2, the automatic switches 212 are pneumatically activated, and control the routing of pressurized air through lines 220 to and from an associated solenoid mounted relative to each latch mechanism 210. It will be appreciated, however, that other automatic type switches may be incorporated into a system based upon the invention, including hydraulic switches, wherein the lines 220 could carry some form of fluid, or electrical switches, wherein the lines 220 would be representative of powercarrying electrical conductors, and the solenoids would be electrically activated.

A plurality of spaced-apart automatic switches are preferably used with respect to each cart loading and unloading area, so that an operator responsible for cart unlatching in particular may do so irrespective of the length of carts coupled to one another in train-like fashion. To clarify this point, with a full set of coupled carts reaching back to the loading doors of the vehicle, a rearward most automatic switch would be most physically convenient to the operator, whereas, with only a subset of carts, or a single cart latched to a mechanism 210, an automatic switch mounted further within the interior of the cart-hauling vehicle may be more convenient. In a more comprehensive configuration, there may be as many switches available as there are carts, with such switches being placed apart at the distance of a cart for the greatest possible convenience.

In the event that an automatic switch is inoperative or malfunctioning, a manually operated unlatching device such as handle 214 is preferably provided. The handle 214 connects to a cable 222 which may be routed along the top of the vehicle if a ceiling support is so provided, utilizing sheaves 224. So that the latching mechanism may return to a re-latching configuration, a spring 226 is preferably provided to reinstate the handle 214 and the latch to which it is connected, to their former positions prior to activation.

Figure 4:
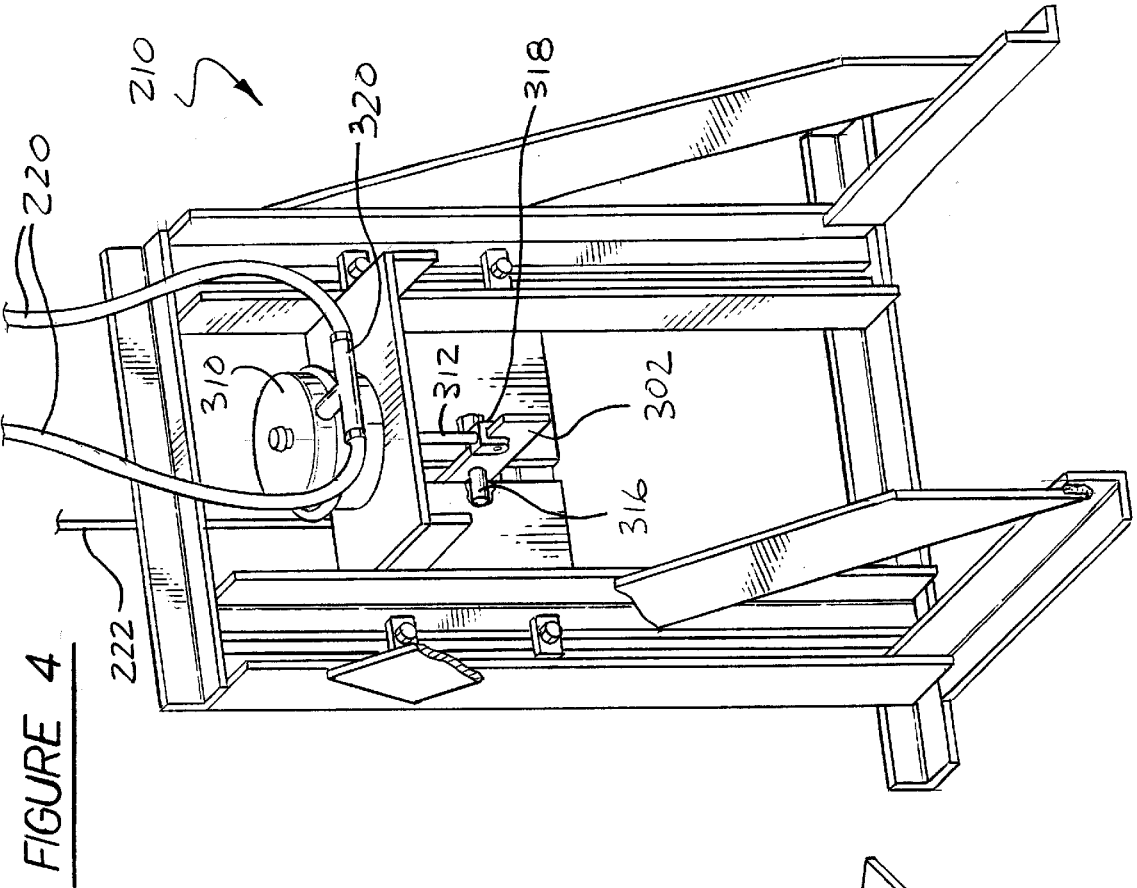
FIG. 4 is a perspective view of the pneumatically operated latching mechanism of FIG. 3, as seen from the backside of the assembly, permitting a better visualization of an air-operated solenoid and coupling linkage.
Figure 3:
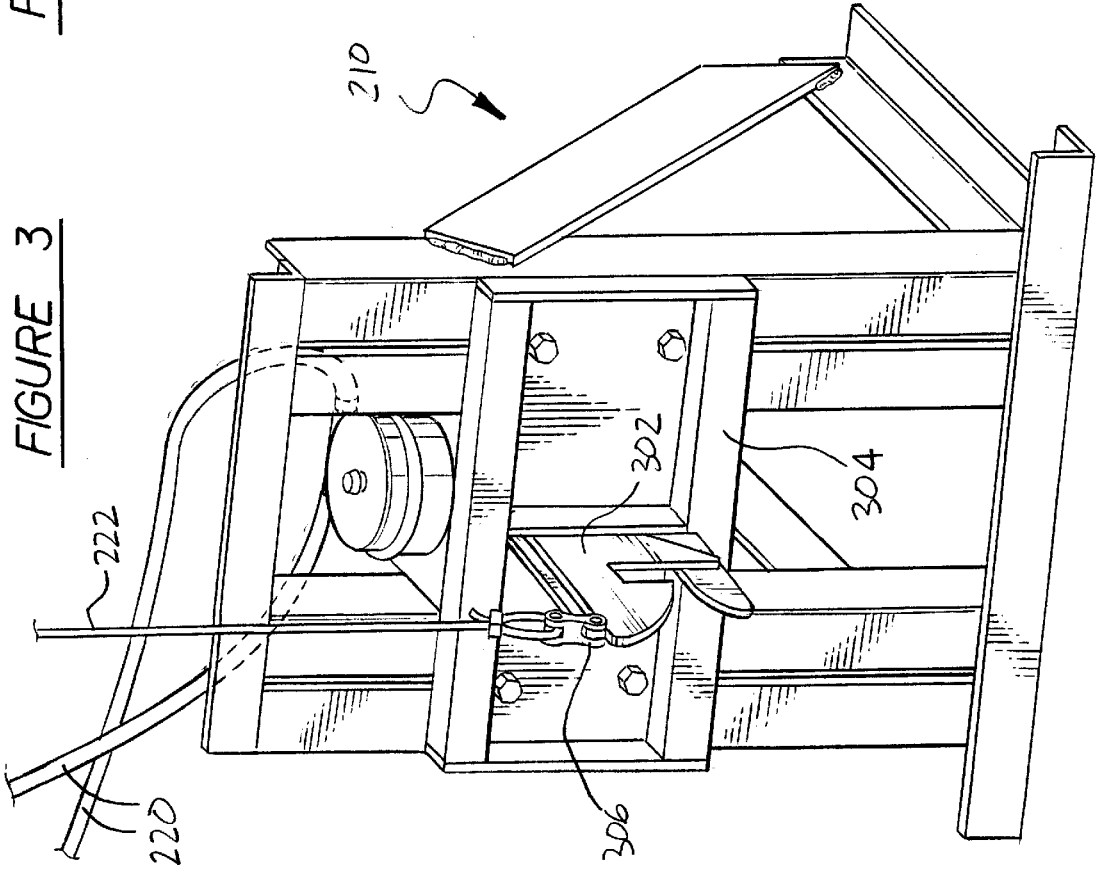
FIG. 3 is a perspective view of a pneumatically operated latch mechanism according to the invention.
Figure 5:
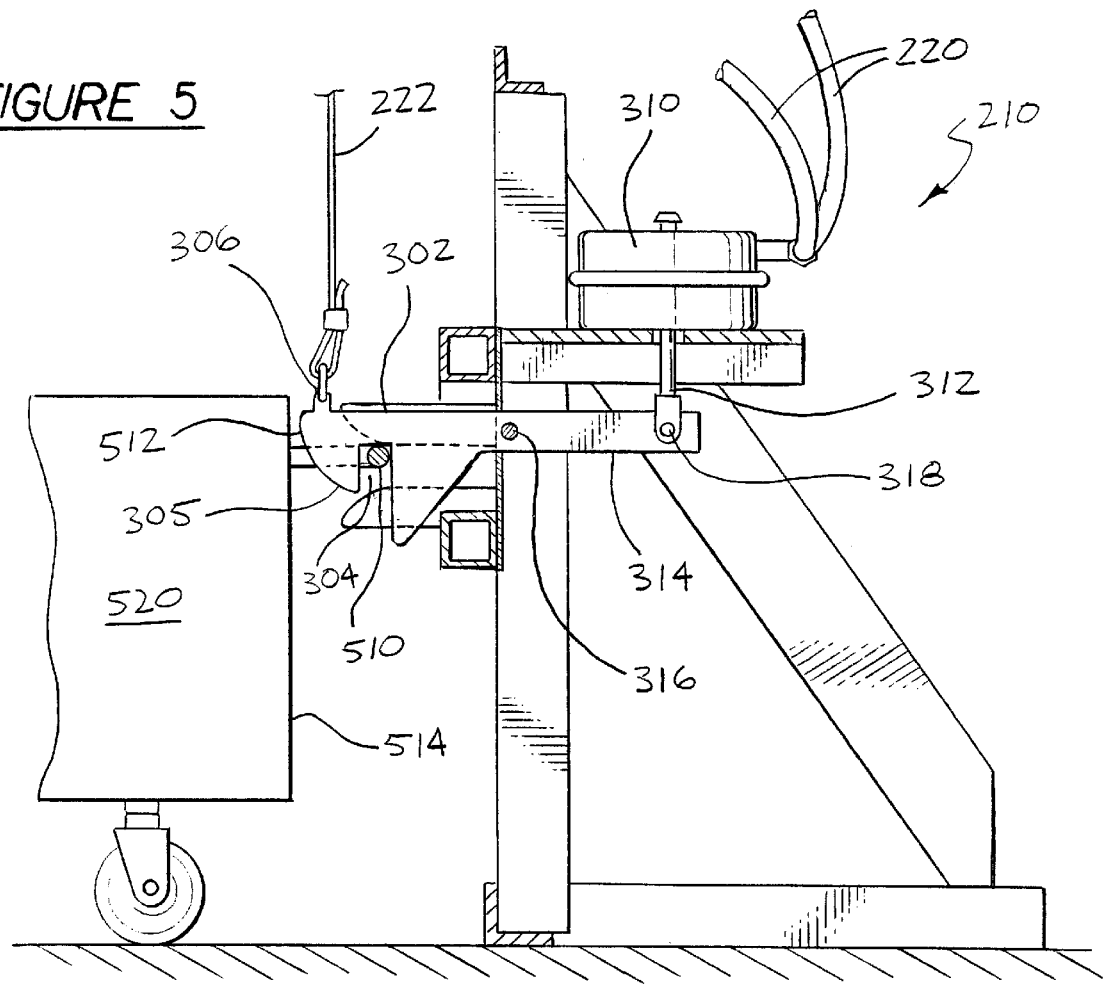
FIG. 5 is a side-view drawing of the apparatus of FIGS. 3 and 4, better illustrating the way in which a latch engages with a cart-mounted bar according to one aspect of the invention.

The actual latching and unlatching of a particular mechanism 210 is best understood with reference to FIGS. 3–5, to which the reader's attention is directed at this time. FIG. 3 illustrates, from an oblique perspective, a frontal view of a latch mechanism 210, as would be visible from the interior of trailer 106. In the embodiment of a pneumatically operated version of the invention currently being described, air hoses 220 connect to a solenoid 310 mounted on the mechanism 210. The plunger of the solenoid 310 (not visible in FIG. 3) interconnects to a pivoting latch member or bar 302 having a notch 304 configured to engage a bar 510 supported on the rearward end of a cart, as best seen in FIG. 5. FIGS. 3 and 5 also show a manner in which the manually operable cable 222 preferably connects to an upper edge of the pivoting bar 302 through a fastener at 306.

FIG. 4 illustrates the latch mechanism 210 from a back, perspective view as would be seen from the forward wall 203 of the cargo-loading area of the semi-truck trailer 106. This view better illustrates the pivot point 316 of the latch bar 302, and the manner in which a plunger 312 from the solenoid 310 pivotably interconnects to the latch bar 302 at a joint 318. The perspective view of FIG. 4 also illustrates the manner in which air hoses 220 interconnect to the solenoid 210. In particular, a T-joint 320 may be deployed for such purpose, the T-joint having a first end routed to one of the automated switches 212, and a second end of the "T" being routed to the other automated switch 212. The T-joint 320 preferably allows either automated switch 212 to provide pressurized air to the solenoid 310, thereby actuating the solenoid 310. T-joint 320 also preferably includes a two-way check valve so that pressurized air supplied through one of the lines 220 cannot bleed off through the other line. That is, if one of the switches 212 is actuated, it feeds compressed air to the T-joint 320 through one of the lines 220. The T-joint 320 prevents air from flowing into or out of the other line 220 so that pressurized air provided by one of the switches 212 is not bled off through the other switch 212. Pressurized air may then be bled off from the solenoid 310 by switching the actuated switch 212 back to a non-actuated position. The switch then allows air to bleed out of the solenoid 310, through the T-joint 320 into one of the lines 220 and to the switch 212 that had been actuated. As will be clear to one of skill in the art, any number of additional switches 212 may be added through the use of additional T-joints.

Referring back to FIG. 2, the plumbing of the switches 212 is shown. Compressed air is provided to each of the switches 212 through a compressed air supply line 211. The compressed air supply line may be connected to a source of compressed air available on the trailer 106 or to an external source of compressed air through a fitting, as will be clear to one of skill in the art. The switches 212 selectively provide compressed air to the lines 220 when they are switched from a deactivated to an activated position. If either switch 212 is switched to the activated position, it provides compressed air to actuate the associated solenoid 310.

FIG. 5 illustrates the latch mechanism of FIGS. 3 and 4, but from a side view in partial cross-section, with support members being removed for the sake of clarity. This figure best illustrates the way in which a rearward bar 510 supported on the back end 514 of a cart 520 through one or more standoffs 512 engages with the notch 304 on the latch bar 302. In the figure, a substantial latching of the bar 510 within the notch has taken place, and the bar 304 now rests in a substantially horizontal position retaining cart 520 (and other carts coupled thereto). Note that the latch bar 302 preferably includes a smoothly tapered forward surface 305 enabling a cart to be secured by the latching mechanism 210 when it is pushed thereinto. As the cart 520 approaches the latching mechanism 210, the bar 510 frictionally engages with the surface 305 and pushes the latch bar 302 up and over the bar 510 without the need for activating either an automatic or manual switch. When the solenoid 310 is actuated, it moves its plunger 312 downwardly thereby pivoting the latch bar 302 about the pivot point 316. This causes the forward half of the latch bar 302, including the notch 304, to move upwardly, thereby disengaging the cart bar 510. The notch 304 has a rear edge which is longer than its front edge. The shape of the notch 304 serves two purposes. First, when the cart 520 is pushed into the latch bar 302, the cart bar 510 is prevented from overshooting the notch 304 by the longer rear edge of the notch 304. Secondly, the longer rear edge of the notch 304 tends to urge the cart bar 510 away from the latch mechanism 210 when the solenoid 310 is actuated. That is, as the latch bar 302 pivots, the longer rear edge of the notch 304 swings slightly forward thereby pushing the cart bar 510 away from the latching mechanism 210.

When an actuated switch 212 is returned from its actuated to its deactivated position, air pressure is bled back through line 220 to the switch 212 and the solenoid 310 allows the latch bar 302 to fall back to its normal, horizontal position. The system is preferably arranged such that the level of bleed is controlled to cause the plunger 312 of a solenoid 310 to slowly advance upwardly and back into the body of the solenoid, causing the latch bar 302 to pivot in a gradual manner in returning to the more-or-less horizontal position in preparation for re-engaging with the rearward bar 510 of a cart 104. For example, in a preferred embodiment, the bleed would be controlled such that this return of the latch bar 302 to its original state might take a few seconds, thereby allowing an operator sufficient time to conveniently remove one or more carts from the latching mechanism 210, without fearing that the latch bar will fall quickly and inadvertently re-engage the cart closest to the front wall of the hauling vehicle. It will be appreciated by those of skill in the art of mechanics and electromechanics, that a controlled movement of this kind between activation and de-activation may similarly be brought about through the use of hydraulics or electronics, in the latter case perhaps through the inclusion of appropriate delay circuitry.

FIGS. 3–5 also illustrate another aspect of the preferred embodiments of the latching mechanism 210. The solenoid 310 and latch bar 302 are supported on a movable support 317 which is bolted to a base 319. The base 319 is preferably a heavy-duty steel bracket which is secured to the floor of the transport vehicle adjacent the forward wall. Movable support 317 is bolted to the base 319 in such a way that it may be vertically positioned at various heights from the floor of the transport vehicle. By adjusting the vertical position of the movable support 317, the latching mechanism 210 may be adjusted to engage carts with latching bars at various heights.

Figure 6:
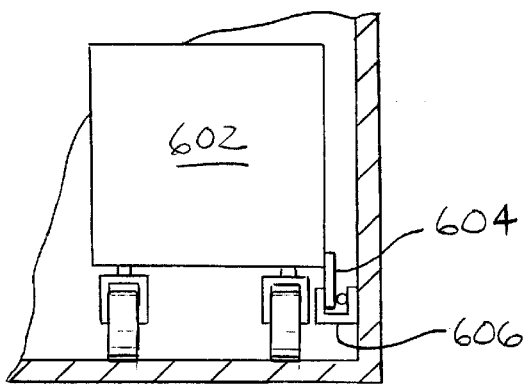
FIG. 6 is a drawing of an alternative cart-stabilization arrangement according to the invention.
Figure 7:
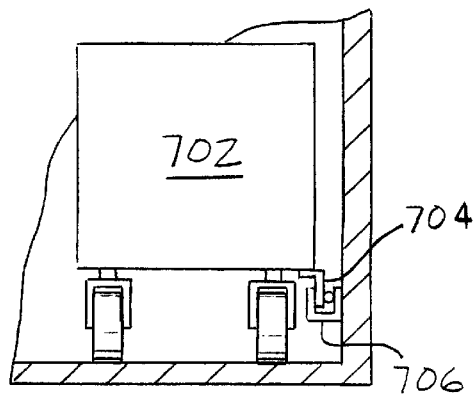
FIG. 7 is a drawing of yet a further alternative stabilization arrangement according to the invention.

To further stabilize the carts within the cart-hauling vehicle, one or more elongated rails may be provided on the bottom surface of the loading platform, such as rails 120 in FIG. 2. Although the rails 120 illustrate how the set of wheels on one side of either cart train may be retained, it should be clear that additional rails may be provided to stabilize the wheels on both sides of each cart. In addition, as shown in FIGS. 6 and 7, stabilization members 606, 706 may be provided on the sides of the inner walls of the hauling vehicle, using bar stock or angle stock, as appropriate to a particular geometry. In the embodiment shown in FIG. 6, a guide bar 604 is welded to the side of each cart 602 in a position such that the guide bar 604 engages the stabilization member 606 as the cart 602 is pushed into the hauling vehicle. Likewise, in FIG. 7, a guide bar 704 is welded to the bottom of each cart 702 such that the guide bar 704 engages a stabilization member 706 as the cart 702 is pushed into the hauling vehicle.

Figure 8:
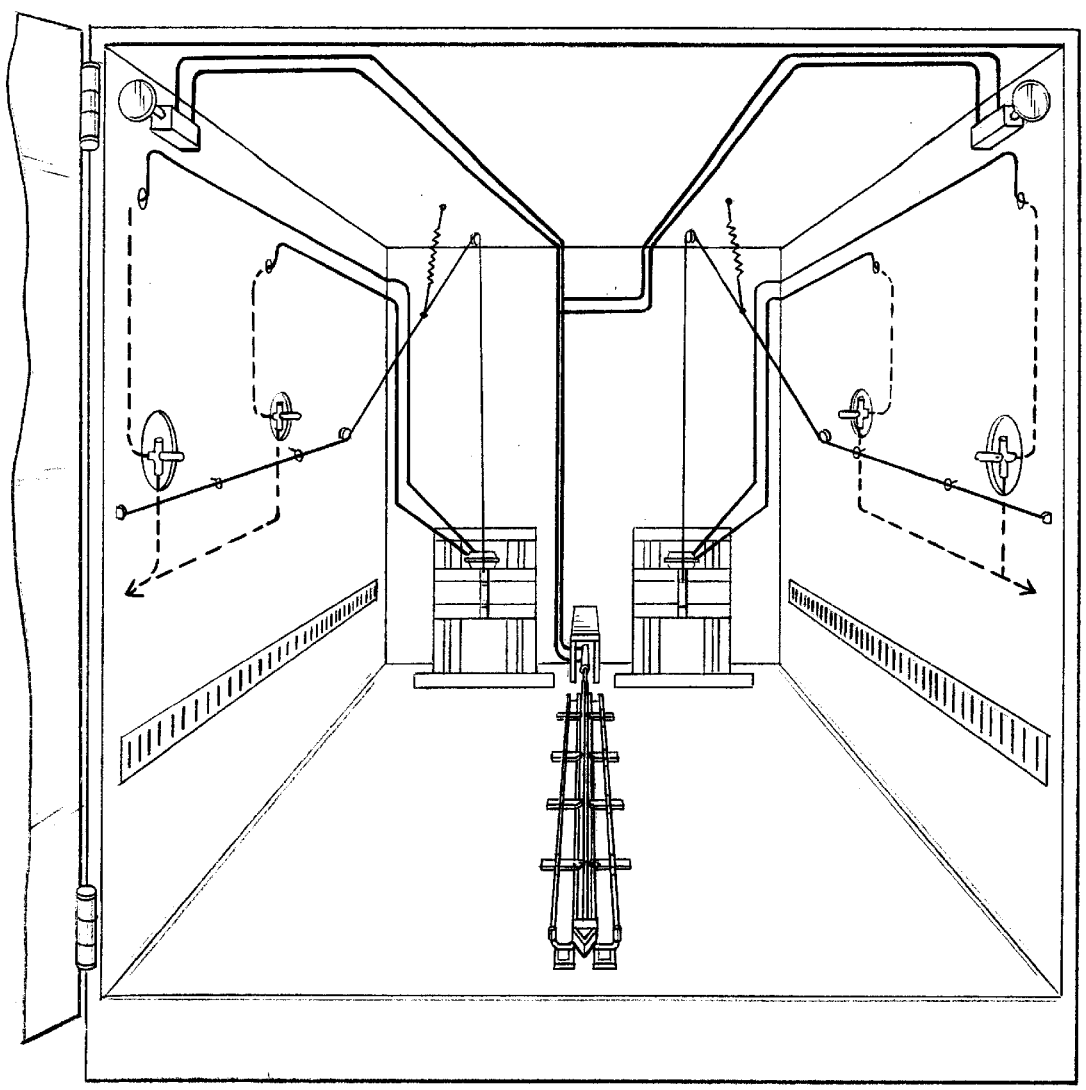
FIG. 8 is a drawing looking into the rear-loading end of a semi-truck, illustrating major features according to the alternative embodiments of the invention.

Referring now to FIG. 8, additional embodiments according to the present invention will be discussed. As in FIG. 2, a trailer 106 is shown with a pair of latching mechanisms 210 located adjacent the forward wall 203 of the trailer 106. However, a secondary latching mechanism 410 is also shown. The secondary latching mechanism 410 is designed to secure the carts (not shown) to the floor 412 of the trailer 106. The secondary latching mechanism 410 may be used in addition to or in place of the primary latching mechanisms 210.

Figure 9:
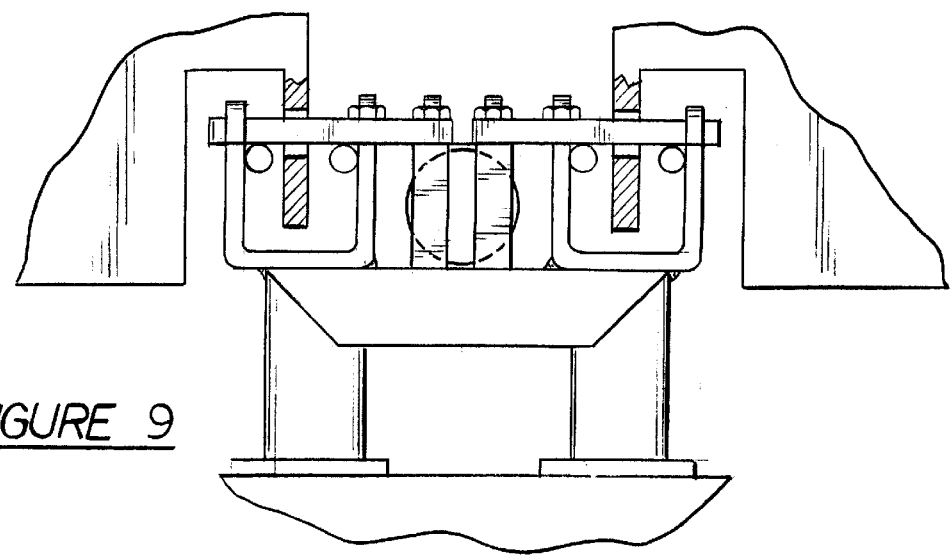
FIG. 9 is an end view of a secondary latching mechanism according to the present invention.
Figure 10:
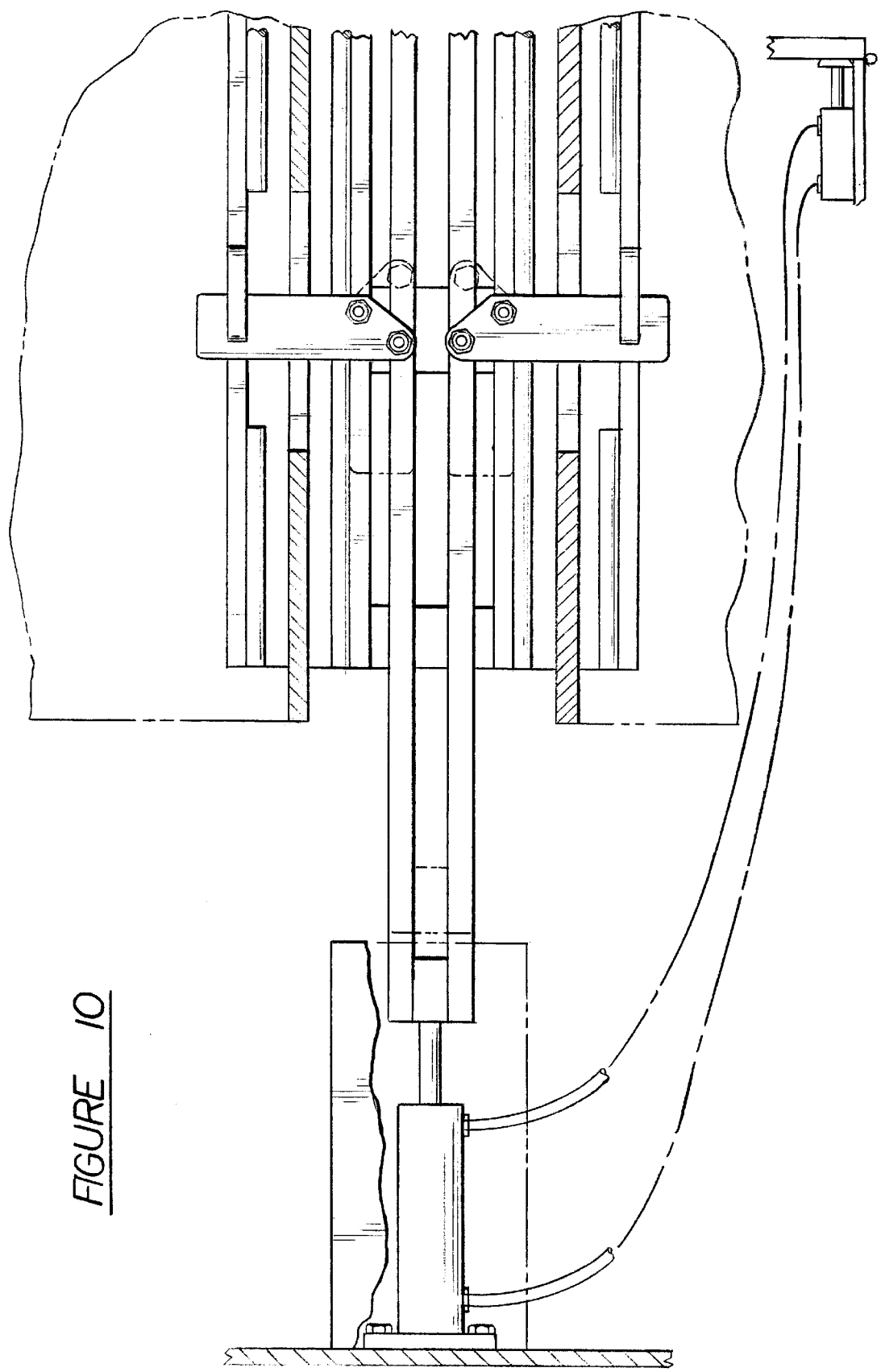
FIG. 10 is a plan view of a portion of a secondary latching mechanism according to the present invention.

Referring to FIGS. 8–10, the secondary latching mechanism 410 includes an elongated latching frame 414 secured to the floor 412 of the trailer 106. The latching frame 414 is longitudinally between the front and rear of the trailer 106 midway between the two side walls 207. As shown, the latching frame 414 includes a pair of parallel, upwardly facing, elongated, U-shaped channels 414 that run longitudinally. For ease of description, each U-shaped channel is defined as having an elongated inner piece 430 and a parallel elongated outer piece 432. The inner 430 and outer 432 pieces define the two legs of the upwardly facing U-shaped channel 420. The inner piece 430 and outer piece 432 are spaced apart so as to define a open channel 434 therebetween.

The carts 416 (shown partially in FIG. 9) for use with the secondary latching mechanism 410 each include a flange 418 which is designed to engage with a secondary latching mechanism 410. The flanges 418 on the carts 416 extend downwardly and engage the U-shaped channels 420 as the carts 416 are moved into the trailer 106. That is, the flanges extend downwardly into the open channel 434 between the inner piece 430 and outer piece 432 of one of the U-shaped channels 420. The flanges 418 include slots 422 defined therein. The secondary latching mechanism 410 further includes latch members 424 designed to engage the slots 422 in the flanges 418 when the carts 416 are properly positioned in the trailer 106. The latch members 424 are shown in their latched position in both FIGS. 8 and 9. In the latched position, each latch member 424 extends across the top of one of the U-shaped channels 420 between the inner piece 430 and the outer piece 432 thereof. When a flange 418 of one of the carts 416 is positioned such that the slot 422 in the flange 418 lines up with the latch member 424, the latch member 424, in its latched position, extends through the slot, thereby locking the flange 418 into the U-shaped channels 420.

The latch members 424 may be moved into and out of their latched position in a number of ways, as will be clear to one of skill in the art. For example, they may be retracted linearly from the slots 422. However, as best shown in FIG. 10, the latch members 424 pivot between their latched positions, as shown by solid lines, and their unlatched positions, as shown in phantom in FIG. 10. The latch members 424 may be encouraged to pivot in a number of ways. In the preferred and illustrated embodiment, each of the latch members 424 is pivotally interconnected with the inner piece 430 of one of the U-shaped channels 420 by a stud 428. Located a short distance from the pivot axis, defined by the stud 428, the latch member 424 is interconnected with an elongated slider 426 via a second stud 429. Preferably, each latch member includes bushings or bearings surrounding the studs 428, 429 to improve the pivotal action.

The elongated slider 426 is located between the two U-shaped channels 420 and parallel thereto. The slider 426 moves linearly in a longitudinal direction, parallel to the U-shaped channels 420, such that the latch members 424 are forced to pivot between the latched and unlatched position, as shown in FIG. 10. The outer piece 432 of the U-shaped channel 420 preferably includes a finger 433 under which the latch member 424 extends in its latch position. The finger 433 helps to prevent the latch member from being forced upwardly.

The elongated slider 426 is moved in a longitudinal direction by an actuator 436. This actuator 436 may be any of a variety of types such as pneumatic, hydraulic, or electric. As shown, the actuator 436 is pneumatically operated, as are the earlier described latching mechanisms 210. To move the latch members 424 from their unlatched to their latched positions, the slider 426 is moved toward the front of the trailer 106 by the actuator 436, thereby pivoting the latch members 424. To unlatch the latch members 424, the slider 426 is moved toward the rear of the trailer 106 by the actuator 436.

As best shown in FIG. 8, the secondary latching mechanism 410 preferrably includes a plurality of latch members 424 at positions spaced apart along the latching frame 414. Preferably, one latch member 424 engages a flange on each of the carts positioned in the trailer 106. Therefore, the latch members 424 are spaced apart by a distance equal to the length of one cart. The illustrated embodiment is designed for loading and latching up to four carts on each side of the secondary latching mechanism 410, for a total of eight carts. Many alternatives are possible. For example, the secondary latching mechanism could be positioned along the side walls 207 or could be positioned above the floor so as to engage a higher up flange on each of the carts. Alternatively, the secondary latching mechanism 410 could be altered to engage a different portion of the carts, such as directly engaging the tires or wheels of the carts or the bodies of the carts themselves. The mechanism 410 may also be designed to work with more or fewer carts. The floor rails 120 discussed with earlier embodiments may also be provided or incorporated with the secondary latching mechanism 410.

As discussed earlier, the latching mechanisms 210 may be actuated in any of a number of ways, including automatic switches 212 and manual devices. Referring again to FIG. 8, an alternative manual device is shown. In this embodiment, the handle 214, of FIG. 2, is eliminated with the cable 222 instead running along the side wall 207 of the trailer 106. The cable 222 is fixed at one of its ends to the primary latch mechanism 210 and at its other end to the side wall 207 adjacent the rear of the trailer 106. Because the cable 222 runs along the side wall 207, an operator may grab the cable at any position along the side wall 207 and pull on the cable, thereby manually operating the latch mechanism 210. This is similar to the pull cords sometimes found in public transportation vehicles such as buses and trains.

An alternative to the automatic switches 212, discussed earlier, is also shown in FIG. 8. Door switches 440 are mounted to the side walls 207 of the trailer 106 adjacent the rear of the trailer. Each door switch 440 has a plunger 442 extending rearwardly out of the rear opening of the trailer 106 such that when the doors 444 on the trailer 106 are closed, the plungers 442 are depressed into the door switches 440. In this way, the door switches sense whether the trailer doors 444 are opened or closed. As shown, the door switches 440 are interconnected with the secondary latching mechanism 410. The system is designed such that when the trailer doors 444 are opened, the door switches 440 cause the secondary latching mechanism 410 to unlatch. Though shown interconnected only with the secondary latching mechanism 410, the door switches 440 are preferably also interconnected with the primary latching mechanisms 210 so that when the doors 444 are opened, both the primary and secondary latching mechanisms 210 and 410 are unlatched. The automatic switches 212 may then be eliminated. Alternatively, the switches 212 may be left as an alternative way to activate the latching mechanisms. In operation, carts 416 are moved into the back of the trailer 106 such that they engage the primary latching mechanisms 210 and secondary latching mechanisms 410 as discussed previously. When the doors 444 are closed, after the carts 416 are in the trailer 106, the door switches 440 cause the primary 210 and secondary 410 latching mechanisms to latch thereby retaining the carts 416 in position in the trailer 106. As will be clear to one of skill in the art, the secondary latching mechanism is especially effective for holding the carts 416 downwardly so that they cannot bounce around in the trailer 106 as it is transported. The secondary latching mechanism 410 also partially serves to control fore and aft movement of the carts 416 and, therefore, the primary latching mechanisms 210 may, in some applications, be eliminated. However, the primary latching mechanisms 210 are especially effective at preventing for and aft movement of the carts 416.

I claim:

1. An automated latching and release system adapted for use with a train of interconnected wheeled carts of the type configured for materials handling and a vehicle having a cart-carrying area with a fore section and an aft section for cart loading and unloading, the vehicle further having a floor and a front wall, the system comprising:

a latching mechanism mounted in the fore section of the vehicle adjacent the front wall, said mechanism including a latch member which has a first position in wherein the member physically engages with a forwardmost cart so as to retain them forwardmost cart in a transport position and a second position wherein the member physically disengages from the forwardmost cart so as to release the forwardmost cart from the transport position, the latching mechanism operable to move the member between the first and second positions; and a switch operable to control said latching mechanism to move the latch member from the first position to the second position to release the forwardmost cart from the transport position so that it may be unloaded from the vehicle, the switch being disposed in the aft section of the vehicle, physically remote from the latching mechanism, thereby enabling a user to release the forwardmost cart without having to manipulate the latch member directly.

2. The system of claim 1, wherein the forwardmost cart further includes an engagement member configured for engagement with the latch member.

3. The system of claim 2, wherein the engagement member is a latch bar.

4. The system of claim 1, wherein each cart has wheels and the cart carrying area further includes one or more rails mounted to the floor for engaging with the wheels of a cart to further physically stabilize the cart while retained in the transport position.

5. The system of claim 1, wherein the vehicle is a semi-truck and the cart-carrying area includes the floor of an enclosed trailer coupled thereto.

6. The system of claim 1, wherein the cart-carrying area includes a side wall, and wherein the switch is mounted on the side wall.

7. The system of claim 1, wherein a door provides access to the cart-carrying area and the switch releases the cart when the door is opened.

8. The system of claim 1, wherein the latching mechanism comprising a floor mounted latching frame on which the latch member is supported.

9. The system of claim 1, wherein the latching mechanism is pneumatically controlled by the switch.

10. The system of claim 1, further including coupling means on each cart enabling a plurality of carts to be interconnected as said train, and including a plurality of switches operable to release the carts from the transport position, the switches being spaced-apart from one another by a distance approximately equal to a length of a cart.

11. A material handling system, comprising:
a train of interconnected wheeled carts for holding material, including coupling means enabling the carts to be joined together in train-like fashion with a forwardmost cart and a rearwardmost cart;
a transport vehicle to receive the set of carts, the vehicle including a forward section and a rearward section for cart loading and unloading the vehicle further including a floor and a front wall; and
a controllable latching mechanism mounted in the forward section of the transport vehicle adjacent the front wall for making a coupling engagement with the forwardmost cart, thereby physically retaining the set of carts; and
a remote switch for releasing the forwardmost cart, the switch being disposed proximate to the rearward section of the transport vehicle, enabling a user to disengage the set of carts from the latching mechanism and remove the set of carts through the rearward section of the transport vehicle without having to visit the forward section of the transport vehicle.

12. The system of claim 11, wherein each cart further includes an engagement member configured for engagement with the latch mechanism.

13. The system of claim 12, wherein the engagement member is latch bar.

14. The system of claim 11, wherein the transport vehicle floor includes one or more rails for engaging with the wheels of each cart to further physically stabilize the carts during transport.

15. The system of claim 11, wherein the transport vehicle is a semi-truck trailer.

16. The system of claim 11, wherein the transport vehicle further includes an upstanding side wall, and wherein the switch is mounted on the side wall proximate to the rearward section.

17. The system of claim 11, wherein the controllable latching mechanism further includes:
an engagement member disposed on an exposed surface of one of the wheeled carts; and
a device mounted within the cart-hauling vehicle which engages and disengages with the member in response to the switch.

18. The system of claim 11, wherein the transport vehicle includes a door, and the remote switch releases the forwardmost cart when the door is opened.

19. The system of claim 11, wherein the system further comprising a secondary controllable latching mechanism disposed adjacent the floor of the vehicle, the secondary latching mechanism including a latch member which physically engages with one of the carts.

20. The system of claim 19, wherein the secondary latching mechanism includes a plurality of latch members, one of the latch members physically engaging with each of the carts in the train of carts.

21. A material handling system comprising:
a train of interconnected wheeled carts, a fowardmost cart having a front and an engagement member disposed on the front;
a transport vehicle having a cart carrying area defined by a load floor, the cart carrying area having a fore section and an aft section;
a controllable latching mechanism mounted in the fore section of the cart carrying area, the mechanism operable to selectively engage and retain the engagement member on the forwardmost cart, thereby retaining the forwardmost cart in the cart carrying area;
a control for controlling the latching mechanism, the control including a switch mounted in the aft section of the cart carrying area, remote from the latching mechanism, enabling a user to disengage the latching mechanism from the forwardmost cart without having to visit the fore section of the cart carrying area.

22. The material handling system of claim 21, wherein:
at least one of the carts further includes a lower surface with a secondary engagement member disposed on the lower surface;
the material handling system further comprising a secondary latching mechanism mounted to the floor of the vehicle, the secondary latching mechanism operable to selectively engage and retain the secondary engagement member, thereby retaining the cart adjacent the floor.

23. The material handling, system of claim 22, wherein the control further controls the secondary latching mechanism.

24. A material handling, system comprising:
a train of interconnected wheeled carts, at least one of the carts having a lower surface and an engagement member disposed on the lower surface;
a transport vehicle having a cart carrying area defined by a load floor, the cart carrying, area having a fore section and an aft section;
a controllable latching mechanism mounted to the floor of the cart carrying area, the mechanism operable to selectively engage and retain the engagement member on the cart, thereby retaining the cart in the cart carrying area;

a control for controlling the latching mechanism, the control including a switch mounted in the aft section of the cart carrying area, remote from the latching mechanism, enabling a user to disengage the latching mechanism from the cart.

25. The material handling system of claim 24, wherein:

the latching mechanism comprises an upwardly facing elongated U-shaped channel extending longitudinally from the aft section to the fore section of the cart carrying area, the channel defined by a spaced apart first side and second side, the latching mechanism further comprising a latch member having a first position wherein the latch member extends between the first and second sides of the channel and a second position wherein the latch member does not extend between the first and second sides of the channel.

26. The material handling system of claim 25, wherein:

the engagement member on the cart comprises a downwardly extending flange configured to engage the U-shaped channel, the flange having a hole defined therethrough configured to receive the latch member in the first position.

* * * * *